US012452597B2

(12) United States Patent
Ren et al.

(10) Patent No.: US 12,452,597 B2
(45) Date of Patent: *Oct. 21, 2025

(54) COAXIAL SPEAKER

(71) Applicant: AAC Microtech (Changzhou) Co., Ltd., Changzhou (CN)

(72) Inventors: Zhang Ren, Shenzhen (CN); Qi Wang, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/914,364

(22) PCT Filed: Jul. 20, 2022

(86) PCT No.: PCT/CN2022/106754

§ 371 (c)(1),
(2) Date: Sep. 26, 2022

(87) PCT Pub. No.: WO2024/000690

PCT Pub. Date: Jan. 4, 2024

(65) Prior Publication Data

US 2025/0142259 A1 May 1, 2025

(30) Foreign Application Priority Data

Jun. 30, 2022 (CN) ......................... 202221691733.0

(51) Int. Cl.

| | |
|---|---|
| ***H04R 9/02*** | (2006.01) |
| ***H04R 7/04*** | (2006.01) |
| ***H04R 9/06*** | (2006.01) |

(52) U.S. Cl.

CPC ................ *H04R 7/04* (2013.01); *H04R 9/06* (2013.01)

(58) Field of Classification Search

CPC .................................... H04R 7/04; H04R 9/06
USPC ......................................... 381/412, 413, 419
See application file for complete search history.

(56) References Cited

U.S. PATENT DOCUMENTS

| | | | | |
|---|---|---|---|---|
| 9,674,603 B1 * | 6/2017 | Yeh | H04R 9/025 | |
| 10,951,991 B2 * | 3/2021 | Bogdanov | H04R 9/06 | |
| 11,044,562 B1 * | 6/2021 | Cho | H04R 1/403 | |
| 11,153,679 B1 * | 10/2021 | Hwang | H04R 3/00 | |
| 2004/0161129 A1 * | 8/2004 | Guenther | H04R 9/02 | 381/423 |

(Continued)

*Primary Examiner* — William J Deane, Jr.

(74) *Attorney, Agent, or Firm* — Wiersch Law Group

(57) ABSTRACT

A coaxial speaker includes a magnetic circuit system, a first sound production unit, and a second sound production unit. The first sound production unit and the second sound production unit are coaxially disposed. The first sound production unit surrounds the second sound production unit. The first sound production unit includes a first vibrating diaphragm and a first voice coil. The first voice coil is configured to drive the first vibrating diaphragm to vibrate and produce sound. The second sound production unit includes a second vibrating diaphragm and a second voice coil. The second voice coil is configured to drive the second vibrating diaphragm to vibrate and produce sound. The coaxial speaker ensures concentricity of the first vibrating diaphragm and the second vibrating diaphragm, reduces a height of related products, and reduces cost of the magnetic circuit system.

8 Claims, 3 Drawing Sheets

(56) References Cited

U.S. PATENT DOCUMENTS

| | | | | |
|---|---|---|---|---|
| 2015/0139479 | A1* | 5/2015 | Lai | H04R 9/025<br>381/412 |
| 2020/0107112 | A1* | 4/2020 | Lu | H04R 1/2819 |
| 2020/0186911 | A1* | 6/2020 | Zepp | H04R 1/1075 |
| 2020/0275190 | A1* | 8/2020 | Cho | H04R 9/045 |
| 2023/0239630 | A1* | 7/2023 | Shao | H04R 7/04<br>381/400 |
| 2023/0269538 | A1* | 8/2023 | Shao | H04R 1/24<br>381/412 |
| 2023/0292037 | A1* | 9/2023 | Xu | H04R 1/24 |

* cited by examiner

A-A

B-B

COAXIAL SPEAKER

TECHNICAL FIELD

The present disclosure relates to a field of electroacoustic conversion, and in particular to a coaxial speaker.

BACKGROUND

Coaxial speakers provide two sound production units on the same axis to respectively emit tweeter and mid-bass. According to the coaxial speakers in the related art, vibrating diaphragms of the two sound production units are separated and need to be respectively assembled, which is difficult to ensure concentricity of the vibrating diaphragms of the two sound production units during assembly, thereby resulting in poor coaxial sound effects of the coaxial speakers in the related art. In addition, the two sound production units are stacked along a height direction of the coaxial speakers, and each of the two sound production units includes an independently separated magnetic circuit system, so that a height of a coaxial speaker product in the related art is too high to improve product applicability, and cost of the independent separated magnetic circuit system is too high to improve market competitiveness.

Therefore, it is necessary to provide a new coaxial speaker to solve above technical problems.

SUMMARY

The present disclosure aims to overcome above technical problems, and provides a coaxial speaker capable of ensuring concentricity of two vibrating diaphragms of two sound production units, reducing a height of related products, and reducing cost of magnetic circuit systems.

In order to achieve above aims, the present disclosure provides the coaxial speaker, including a magnetic circuit system, a first sound production unit, and a second sound production unit. The first sound production unit and the second sound production unit are coaxially disposed. The first sound production unit surrounds an outer side of the second sound production unit. The first sound production unit includes a first vibrating diaphragm and a first voice coil. The first voice coil is configured to drive the first vibrating diaphragm to vibrate and produce sound. The second sound production unit includes a second vibrating diaphragm and a second voice coil. The second voice coil is configured to drive the second vibrating diaphragm to vibrate and produce sound. The magnetic circuit system includes a first magnetic gap and a second magnetic gap. The first voice coil is inserted into the first magnetic gap. The second voice coil is inserted into the second magnetic gap. The first vibrating diaphragm and the second vibrating diaphragm are integrally formed.

Furthermore, the coaxial speaker further includes a first frame and a second frame. The first frame surrounds an outer side of the second frame. An outer fixing portion of the first vibrating diaphragm is fixed to the first frame. An inner fixing portion of the first vibrating diaphragm is fixed to the second frame. The second vibrating diaphragm is fixed to the second frame. The first vibrating diaphragm, the second vibrating diaphragm, the first frame, and the second frame are integrally formed.

Furthermore, the magnetic circuit system includes a bottom plate, a first magnet portion, and a second magnet portion. The first magnet portion and the second magnet portion are fixed to the bottom plate. The first magnet portion is disposed on an outer side of the second magnet portion. The first magnet portion is spaced apart from the second magnet portion to form the first magnetic gap. The first magnet portion includes a first magnet and a first pole core. The first magnet is fixed to the bottom plate. The first pole core is fixed to the first magnet. The second magnet portion includes a second magnet, a second pole core, a third magnet, and a third pole core. The second magnet is annular and is fixed to the bottom plate. The second pole core is fixed to the second magnet. The third magnet is annular and is fixed to the second pole core. The third pole core is fixed to the third magnet. The second pole core includes a ring piece portion and a bending portion. The ring piece portion is clamped between the second magnet and the third magnet. The bending portion is bent and extends from an inner periphery of the ring piece portion to a direction distal from the second magnet. The third magnet and the third pole core are spaced apart from the bending portion to form the second magnetic gap.

Furthermore, the second frame is fixed to the third magnet. The inner fixing portion of the first vibrating diaphragm is further fixed to the third magnet.

Furthermore, the first pole core includes a main body portion and extension portions. The main body portion is attached to a surface of the first magnet. The extension portions extend from the main body portion to directions distal from the second magnet portion. The first frame is fixed to the extension portions.

Furthermore, the first sound production unit further includes elastic supporting components and a framework. The elastic supporting components are spaced apart from the first vibrating diaphragm. The framework is connected to the first vibrating diaphragm and the elastic supporting components. The extension portions are respectively disposed on two opposite long axis edges of the coaxial speaker. The elastic supporting components are respectively disposed on two opposite short axis edges of the coaxial speaker. The framework includes supporting legs. The supporting legs are configured to fix the elastic supporting components. The supporting legs are disposed between the first frame and the first magnet portion. An outer fixing portion of each of the elastic supporting components is fixed to the first frame. An inner fixing portion of each of the elastic supporting components is fixed to each of the supporting legs.

Furthermore, the first vibrating diaphragm, the second vibrating diaphragm, the first frame, the second frame, and the framework are integrally formed.

Furthermore, each of the elastic supporting components includes a flexible circuit board and an auxiliary vibrating diaphragm. The flexible circuit board is fixed to the supporting legs. The auxiliary vibrating diaphragm is fixed to a bottom surface, distal from the first vibrating diaphragm, of the flexible circuit board.

Furthermore, the second frame surrounds the third pole core.

According to the coaxial speaker of the present disclosure, the first sound production unit and the second sound production unit are coaxially disposed. Meanwhile, the first vibrating diaphragm of the first sound production unit and the second vibrating diaphragm of the second sound production unit are integrally formed, which reduces the height of the related products, and ensures the concentricity of the first vibrating diaphragm and the second vibrating diaphragm. The magnetic circuit system includes the first magnet portion and the second magnet portion. The first magnet portion is spaced apart from the second magnet portion to form the first magnetic gap of the first sound production unit. Meanwhile, the second magnet portion forms the second magnetic gap of the second sound production unit through the bending portion of the second pole core, which improves a structural utilization rate of the magnetic circuit system, and reduces cost of the magnetic circuit system.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in art, other drawings may be obtained according to the drawings without creative efforts.

DETAILED DESCRIPTION OF EMBODIMENT

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Figure 1:
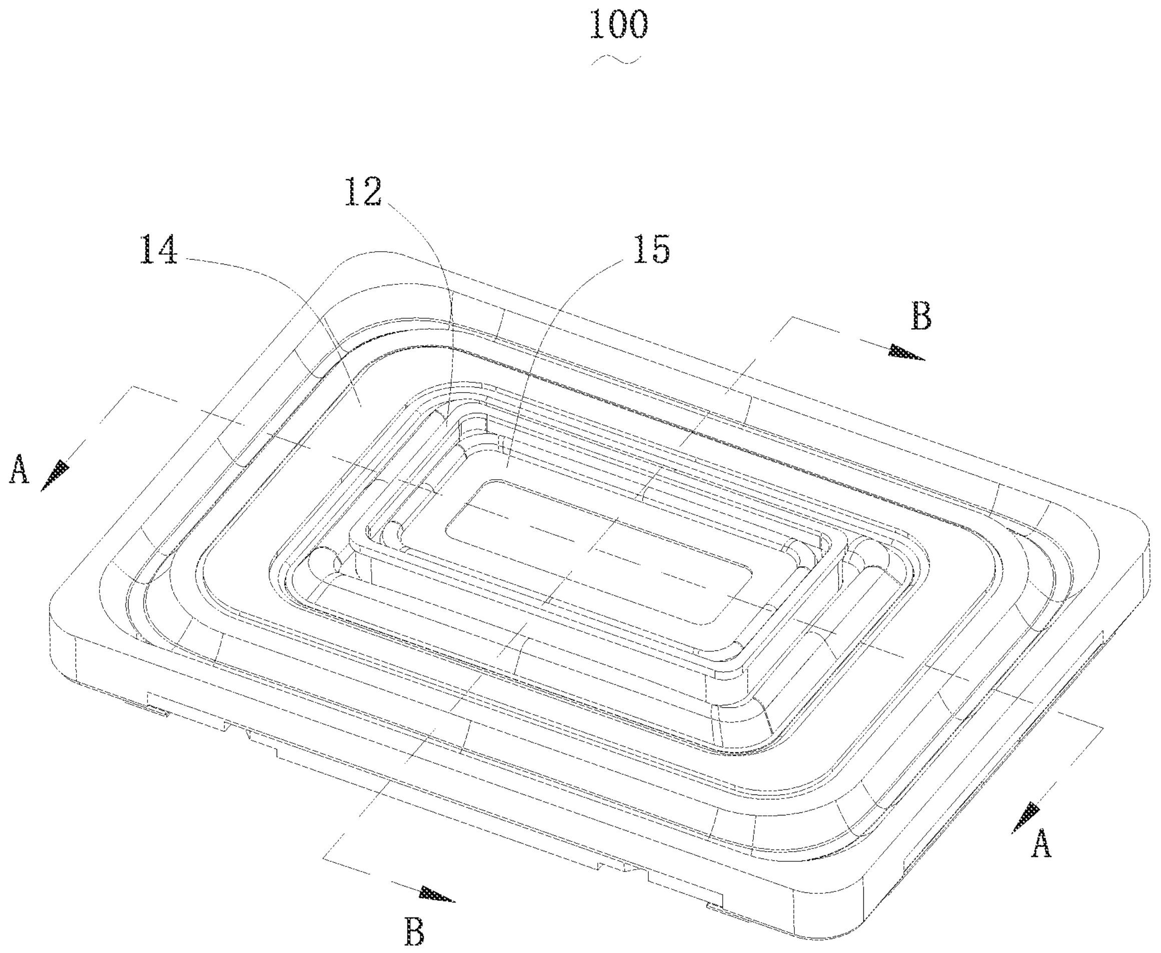
FIG. 1 is a three-dimensional schematic diagram of a coaxial speaker according to one embodiment of the present disclosure.
Figure 2:
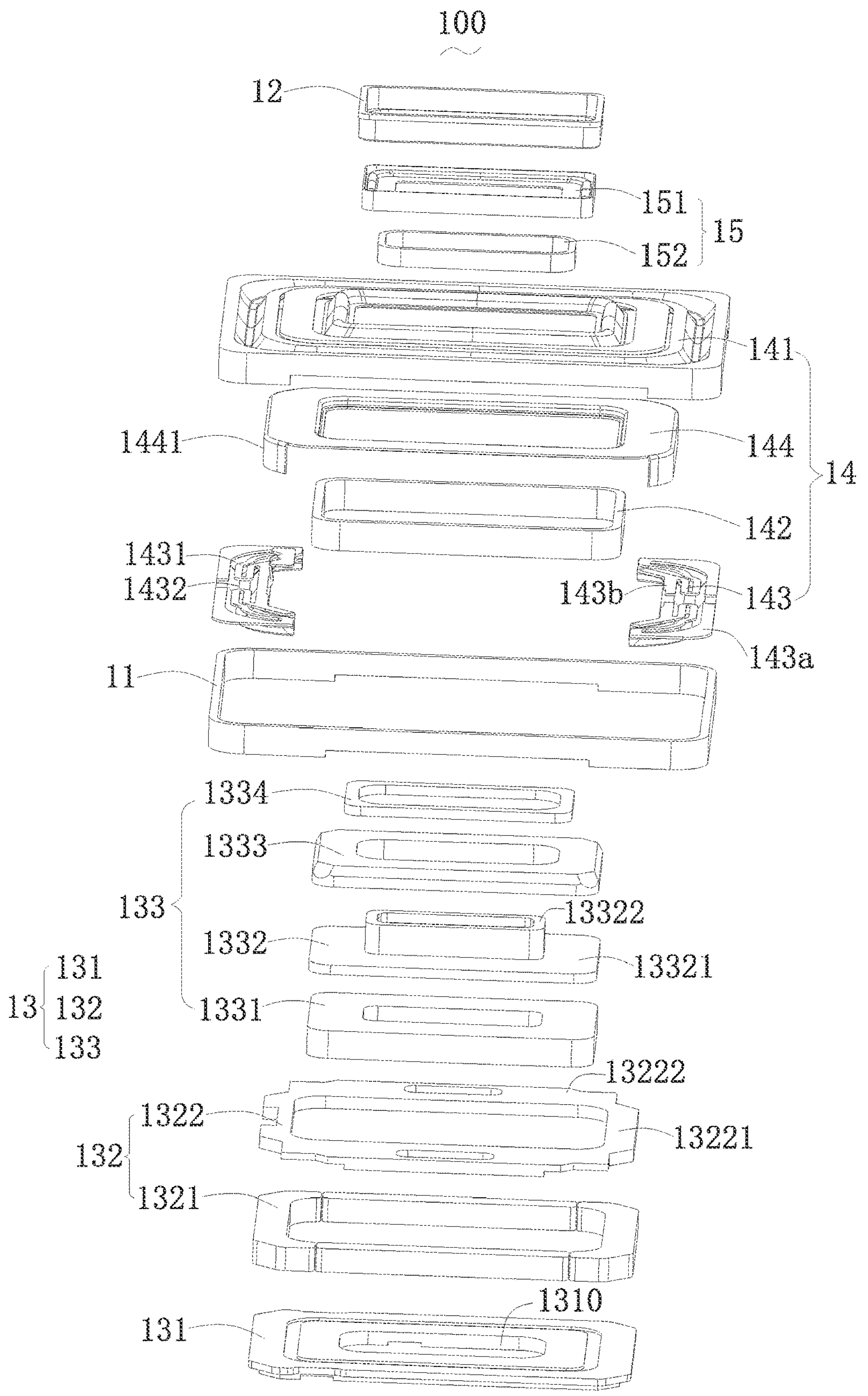
FIG. 2 is a three-dimensional exploded schematic diagram of the coaxial speaker according to one embodiment of the present disclosure.
Figure 3:
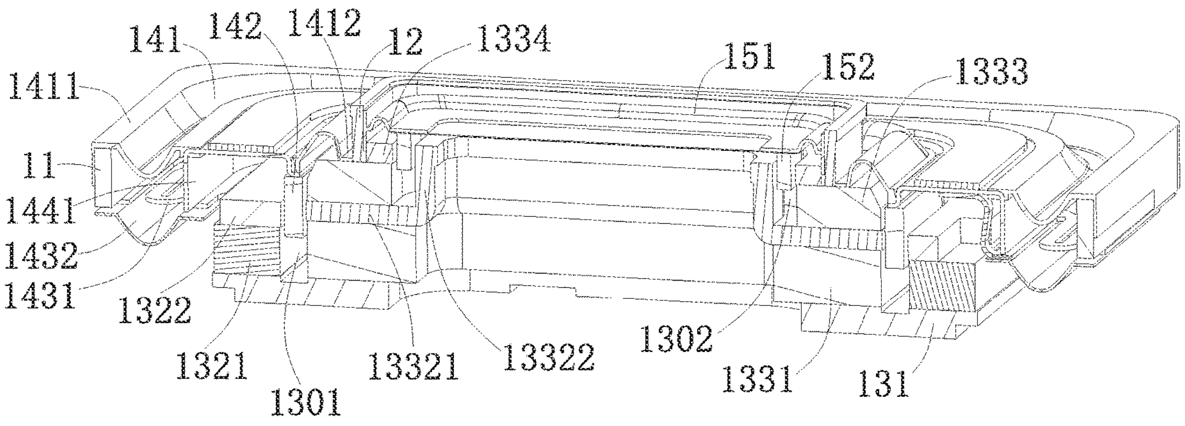
FIG. 3 is a cross-sectional schematic diagram taken along the line A-A shown in FIG. 1.
Figure 4:
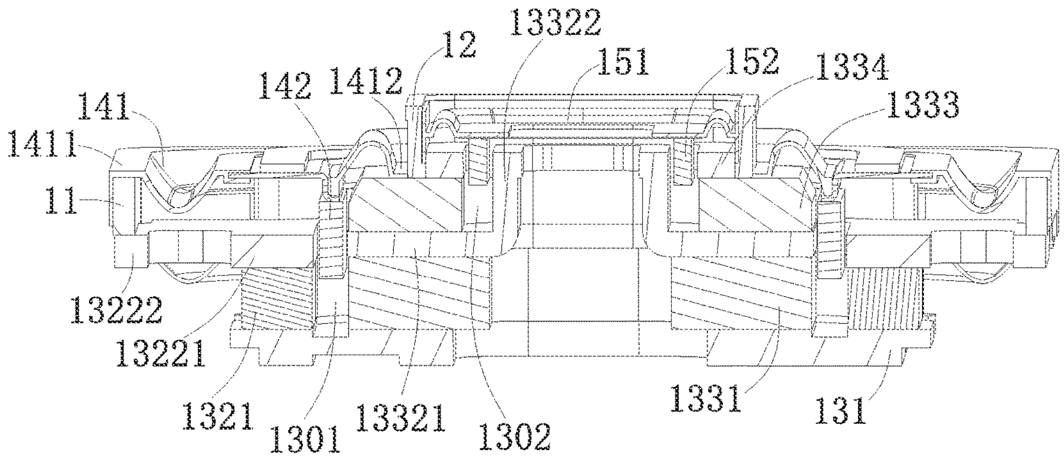
FIG. 4 is a cross-sectional schematic diagram taken along the line B-B shown in FIG. 1.

Referring to FIGS. 1-4, the present disclosure provides a coaxial speaker 100, including a first frame 11, a second frame 12, a magnetic circuit system 13, a first sound production unit 14, and a second sound production unit 15. The first sound production unit 14 and the second sound production unit 15 are coaxially disposed.

The first sound production unit 14 surrounds an outer side of the second sound production unit 15. The first sound production unit 14 includes a first vibrating diaphragm 141 and a first voice coil 142. The first voice coil 142 is configured to drive the first vibrating diaphragm 141 to vibrate and produce sound. The second sound production unit 15 includes a second vibrating diaphragm 151 and a second voice coil 152. The second voice coil 152 is configured to drive the second vibrating diaphragm 151 to vibrate and produce sound. The magnetic circuit system 13 includes a first magnetic gap 1301 and a second magnetic gap 1302. The first voice coil 142 is inserted into the first magnetic gap 1301. The second voice coil 152 is inserted into the second magnetic gap 1302. The first vibrating diaphragm 141 and the second vibrating diaphragm 151 are integrally formed. Integrated forming methods include but are not limited to integral injection molding or integral hot-press molding.

The first frame 11 surrounds an outer side of the second frame 12. An outer fixing portion 1411 of the first vibrating diaphragm 141 is fixed to the first frame 11. An inner fixing portion 1412 of the first vibrating diaphragm 141 is fixed to the second frame 12. The second vibrating diaphragm 151 is fixed to the second frame 12. The first vibrating diaphragm 141, the second vibrating diaphragm 151, the first frame 11, and the second frame 12 are integrally formed. The integrated forming modes include but are not limited to the integral injection molding or the integral hot-press molding.

The magnetic circuit system 13 includes a bottom plate 131, a first magnet portion 132, and a second magnet portion 133. The first magnet portion 132 and the second magnet portion 133 are fixed to the bottom plate 131. The first magnet portion 132 is disposed outside the second magnet portion 133. The first magnet portion 132 is spaced apart from the second magnet portion 133 to form the first magnetic gap 1301. The first magnet portion 132 includes a first magnet 1321 and a first pole core 1322. The first magnet 1321 is fixed to the bottom plate 131. The first pole core 1322 is fixed to the first magnet 1321. The second magnet portion 133 includes a second magnet 1331, a second pole core 1332, a third magnet 1333, and a third pole core 1334. The second magnet 1331 is annular and is fixed to the bottom plate 131. The second pole core 1332 is fixed to the second magnet 1331. The third magnet 1333 is annular and is fixed to the second pole core 1332. The third pole core 1334 is fixed to the third magnet 1333. The second pole core 1332 includes a ring piece portion 13321 and a bending portion 13322. The ring piece portion 13321 is clamped between the second magnet 1331 and the third magnet 1333. The bending portion 13322 is bent and extends from an inner periphery of the ring piece portion 13321 to a direction distal from the second magnet 1331. The third magnet 1333 and the third pole core 1334 are spaced apart from the bending portion 13322 to form the second magnetic gap 1302. The first pole core 1322 includes a main body portion 13221 and extension portions 13222. The main body portion 13221 is attached to a surface of the first magnet 1321. The extension portions 13222 extend from the main body portion 13221 to directions distal from the second magnet portion 133. The extension portions 13222 are respectively disposed on two opposite long axis edges of the coaxial speaker 100.

The first frame 11 is fixed to the extension portions 13222. The second frame 12 is fixed to the third magnet 1333. The inner fixing portion 1412 of the first vibrating diaphragm 141 is further fixed to the third magnet 1333.

The first sound production unit 14 further includes elastic supporting components 143 and a framework 144. The elastic supporting components 143 are spaced apart from the first vibrating diaphragm 141. The framework 144 is connected to the first vibrating diaphragm 141 and the elastic supporting components 143. The elastic supporting components 143 are respectively disposed on two opposite short axis edges of the coaxial speaker 100. The framework 144 includes supporting legs 1441. The supporting legs 1441 are configured to fix the elastic supporting components 143. The supporting legs 1441 are disposed between the first frame 11 and the first magnet portion 132. An outer fixing portion 143*a* of each of the elastic supporting components 143 is fixed to the first frame 11. An inner fixing portion 143*b* of each of the elastic supporting components 143 is fixed to each of the supporting legs 1441. Furthermore, the first vibrating diaphragm 141, the second vibrating diaphragm 151, the first frame 11, the second frame 12, and the framework 144 are integrally formed. The integrated forming methods include but are not limited to the integral injection molding or the integral hot-press molding.

Each of the elastic supporting components 143 includes a flexible circuit board 1431 and an auxiliary vibrating diaphragm 1432. The flexible circuit board 1431 is fixed to the supporting legs 1441. The auxiliary vibrating diaphragm 1432 is fixed to a bottom surface, distal from the first vibrating diaphragm 141, of the flexible circuit board 1431. The first voice coil 142 is electrically connected to an external power supply through the flexible circuit board 1431.

The second frame 12 surrounds the third pole core 1334, thereby facilitating installation and positioning of the second frame 12.

The bottom plate 131 further includes a through hole 1310. The through hole 1310 is communicated with an annular hole of the second magnet 1331 and a cylindrical hole surrounded by the bending portion 13322 of the second pole core 1332. A circuit insert is disposed in the communication area, where the circuit insert is electrically connected to the second voice coil 152 and the external power supply. In other embodiments, the communication area is further filled with functional inserts such as a sound absorption material, a heat conduction material, etc., so as to achieve different functional purposes.

According to the coaxial speaker of the present disclosure, the first sound production unit and the second sound production unit are coaxially disposed. Meanwhile, the first vibrating diaphragm of the first sound production unit and the second vibrating diaphragm of the second sound production unit are integrally formed, which reduces the height of the related products, and guarantees the concentricity of the first vibrating diaphragm and the second vibrating diaphragm. The magnetic circuit system includes the first magnet portion and the second magnet portion. The first magnet portion is spaced apart from the second magnet portion to form the first magnetic gap of the first sound production unit. Meanwhile, the second magnet portion forms the second magnetic gap of the second sound production unit through the bending portion of the second pole core, which improves structural utilization rate of the magnetic circuit system, and reduces cost of the magnetic circuit system.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A coaxial speaker, comprising:

a magnetic circuit system;

a first sound production unit; and a second sound production unit;

wherein the first sound production unit and the second sound production unit are coaxially disposed, and the first sound production unit surrounds an outer side of the second sound production unit; the first sound production unit comprises a first vibrating diaphragm and a first voice coil, the first voice coil is configured to drive the first vibrating diaphragm to vibrate and produce sound; the second sound production unit comprises a second vibrating diaphragm and a second voice coil, the second voice coil is configured to drive the second vibrating diaphragm to vibrate and produce sound; the magnetic circuit system comprises a first magnetic gap and a second magnetic gap, the first voice coil is inserted into the first magnetic gap, the second voice coil is inserted into the second magnetic gap; and the first vibrating diaphragm and the second vibrating diaphragm are integrally formed; the coaxial speaker further comprises a first frame and a second frame; the first frame surrounds an outer side of the second frame, an outer fixing portion of the first vibrating diaphragm is fixed to the first frame, an inner fixing portion of the first vibrating diaphragm is fixed to the second frame, the second vibrating diaphragm is fixed to the second frame; and the first vibrating diaphragm, the second vibrating diaphragm, the first frame, and the second frame are integrally formed.

2. The coaxial speaker according to claim 1, wherein the magnetic circuit system comprises a bottom plate, a first magnet portion, and a second magnet portion; the first magnet portion and the second magnet portion are fixed to the bottom plate, the first magnet portion is disposed on an outer side of the second magnet portion, the first magnet portion is spaced apart from the second magnet portion to form the first magnetic gap, the first magnet portion comprises a first magnet and a first pole core; the first magnet is fixed to the bottom plate, the first pole core is fixed to the first magnet, the second magnet portion comprises a second magnet, a second pole core, a third magnet, and a third pole core; the second magnet is annular and is fixed to the bottom plate, the second pole core is fixed to the second magnet, the third magnet is annular and is fixed to the second pole core, the third pole core is fixed to the third magnet; the second pole core comprises a ring piece portion and a bending portion, the ring piece portion is clamped between the second magnet and the third magnet, the bending portion is bent and extends from an inner periphery of the ring piece portion to a direction distal from the second magnet, and the third magnet and the third pole core are spaced apart from the bending portion to form the second magnetic gap.

3. The coaxial speaker according to claim 2, wherein the second frame is fixed to the third magnet, and the inner fixing portion of the first vibrating diaphragm is further fixed to the third magnet.

4. The coaxial speaker according to claim 2, wherein the first pole core comprises a main body portion and extension portions, the main body portion is attached to a surface of the first magnet, the extension portions extend from the main body portion to directions distal from the second magnet portion, and the first frame is fixed to the extension portions.

5. The coaxial speaker according to claim 4, wherein the first sound production unit further comprises elastic supporting components and a framework; the elastic supporting components are spaced apart from the first vibrating diaphragm, the framework is connected to the first vibrating diaphragm and the elastic supporting components; the extension portions are respectively disposed on two opposite long axis edges of the coaxial speaker, and the elastic supporting components are respectively disposed on two opposite short axis edges of the coaxial speaker; the framework comprises supporting legs, the supporting legs are configured to fix the elastic supporting components, the supporting legs are disposed between the first frame and the first magnet portion, an outer fixing portion of each of the elastic supporting components is fixed to the first frame, and an inner fixing portion of each of the elastic supporting components is fixed to each of the supporting legs.

6. The coaxial speaker according to claim 5, wherein the first vibrating diaphragm, the second vibrating diaphragm, the first frame, the second frame, and the framework are integrally formed.

7. The coaxial speaker according to claim 5, wherein each of the elastic supporting components comprises a flexible circuit board and an auxiliary vibrating diaphragm, the flexible circuit board is fixed to the supporting legs; and the auxiliary vibrating diaphragm is fixed to a bottom surface, distal from the first vibrating diaphragm, of the flexible circuit board.

8. The coaxial speaker according to claim 3, wherein the second frame surrounds the third pole core.

* * * * *